US012108904B2

(12) United States Patent
Qin et al.

(10) Patent No.: US 12,108,904 B2
(45) Date of Patent: Oct. 8, 2024

(54) APPARATUS FOR DETECTING A COOKER LID STATUS

(71) Applicant: IB APPLIANCES US HOLDINGS LLC, Downers Grove, IL (US)

(72) Inventors: Yi Qin, Ottawa (CA); Robert Wang, Ottawa (CA)

(73) Assignee: IB APPLIANCES US HOLDINGS LLC, Downers Grove, IL (US)

( * ) Notice: Subject to any disclaimer, the term of this patent is extended or adjusted under 35 U.S.C. 154(b) by 511 days.

(21) Appl. No.: 16/929,149

(22) Filed: Jul. 15, 2020

(65) Prior Publication Data

US 2021/0015297 A1   Jan. 21, 2021

(30) Foreign Application Priority Data

Jul. 15, 2019 (CA) .................................. CA 3049563

(51) Int. Cl.
*A47J 36/06* (2006.01)
*A47J 27/00* (2006.01)
*A47J 27/08* (2006.01)
*A47J 27/09* (2006.01)

(52) U.S. Cl.
CPC ......... *A47J 27/0802* (2013.01); *A47J 27/004* (2013.01); *A47J 27/09* (2013.01)

(58) Field of Classification Search
None
See application file for complete search history.

(56) References Cited

FOREIGN PATENT DOCUMENTS

| CA | 2666958 A1 | * | 12/2009 | .......... A47J 37/0676 |
| CN | 107616686 | * | 1/2018 | .............. A47J 27/08 |
| CN | 207075510 U | * | 3/2018 | .............. A23N 1/02 |
| CN | 108065761 A1 | * | 5/2018 | .......... A47J 27/0802 |
| EP | 1535550 A1 | * | 6/2005 | .......... A47J 27/0806 |
| EP | 1884179 A2 | * | 2/2008 | .............. A47J 27/08 |
| JP | 2005034223 A | * | 2/2005 | .............. A47J 27/00 |
| WO | WO 2011067532 A1 | * | 6/2011 | ............ A47J 27/004 |

OTHER PUBLICATIONS

Machine translation of CN 108065761 A1 performed on Aug. 2, 2022, Gu et al. (Year: 2018).*

(Continued)

*Primary Examiner* — Dana Ross
*Assistant Examiner* — Kevin Guanhua Wen
(74) *Attorney, Agent, or Firm* — Crowell & Moring LLP

(57) ABSTRACT

An apparatus for detecting status of a cooker lid relative to a cooker body is provided. The apparatus comprises a block mounted to the cooker lid near its periphery rim, and a pole disposed about an upper rim of the cooker body and being movable relative to the cooker body. The block engages with the pole such that the pole is at a first location relative to the cooker body when the cooker lid is separated from the cooker body; the pole is at a second location relative to the cooker body when the cooker lid is placed on the upper rim of the cooker body and is out of position for a predetermined cooking mode, and the pole is at a third location relative to the cooker body when the cooker lid is placed on the upper rim of the cooker body and is in position for the predetermined cooking mode.

23 Claims, 8 Drawing Sheets

(56) References Cited

OTHER PUBLICATIONS

Machine translation of WO 2011067532 A1 performed on Aug. 2, 2022, Deshayes et al. (Year: 2011).*
Machine translation of EP 1535550 A1 performed on Aug. 2, 2022, Seurat et al. (Year: 2005).*
Machine translation of CN 207075510 U performed on Aug. 2, 2022, Wei (Year: 2018).*
Machine translation of EP 1884179 A2 performed on Aug. 2, 2022, Kindler et al. (Year: 2008).*
Machine translation of JP 2005034223 A performed on Feb. 8, 2023, Sakano (Year: 2005).*
Google Translation of CN 107616686 AI, p. 6, performed on Jan. 11, 2024, Gu et al. (Year: 2018).*
Machine translation of CN 107616686 AI performed on Jan. 11, 2024, Gu et al. (Year: 2018).*

* cited by examiner

APPARATUS FOR DETECTING A COOKER LID STATUS

CROSS-REFERENCE TO RELATED APPLICATIONS

This application claims priority to Canadian Patent Application 3,049,563 filed on Jun. 15, 2019, the entire contents of which are incorporated herein by reference.

TECHNICAL FIELD OF THE INVENTION

The present invention relates generally to a cooking appliance, and more specifically to an electric cooker and an apparatus for detecting the status of a cooker lid.

BACKGROUND OF THE INVENTION

Various electric cookers, including electric pressure cookers, are known. In a typical electric pressure cooker, the lid of the cooker engages with the cooker body by way of a lug-bayonet closure arrangement. To properly close the lid for pressure cooking, the lid is placed on top of the cooker body and is rotated from an initial position to a closure position where the bayonets of the lid substantially underlie the matching lugs on the cooker body.

To ensure that pressure cooking can be started only when the lid is fully closed, some prior art electric pressure cookers implemented a mechanism that will cut off the power to the cooker control circuits upon detecting that the lid is placed on the cooker but not at the full closure location. However, such rudimentary design is inadequate in ensuring cooking safety when exceptions or operation anomalies occur. Further, such design generally is limited to pressure cooking, and it can be difficult to apply this mechanism simultaneously to other modes of cooking commonly supported by modern electric pressure cookers, such as the ability to cook with lid being removed or partially closed, or in slow cooking or other cooking mode. As a result, using such electric pressure cooker involves cumbersome, inconsistent or confusing operations amongst different cooking modes, and has led to frustrating user experience, potential safety risk and/or waste of electric energy.

Therefore, there remains a need for improved lid status detection for electric cookers.

SUMMARY OF THE INVENTION

The present invention overcomes the shortcomings of the prior art electric cookers and lids by providing improvements to the existing electric cookers and the lids thereof. The present invention provides an apparatus for detecting a cooker lid status relative to a cooker body, and enabling consistent and more efficient operations of an electric cooker based on the detected cooker lid status. The present invention further provides an electric cooking appliance equipped with such an apparatus for detecting a cooker lid status, and a method of controlling cooking operations using such apparatus.

In accordance with one aspect of the present disclosure, there is provided an apparatus for detecting status of a cooker lid relative to a cooker body, comprising: a block mounted to the cooker lid near a periphery rim thereof; a pole disposed about an upper rim of the cooker body and being movable relative to the cooker body; and wherein the pole is configured to be at a first location relative to the cooker body when the cooker lid is separated from the cooker body, wherein the pole engages the block at a second location relative to the cooker body when the cooker lid is placed on the upper rim of the cooker body and is out of position for a predetermined cooking mode, and wherein the pole engages the block at a third location relative to the cooker body when the cooker lid is placed on the upper rim of the cooker body and is in position for the predetermined cooking mode.

In accordance with another aspect of the present disclosure, there is provided an electric cooking appliance comprising: a cooker lid comprising a block mounted near a periphery rim of the cooker lid; a cooker body comprising a pole disposed about an upper rim of the cooker body and being movable relative to the cooker body; and wherein the pole is configured to be at a first location relative to the cooker body when the cooker lid is separated from the cooker body, wherein the pole engages the block at a second location relative to the cooker body when the cooker lid is placed on the upper rim of the cooker body and is out of position for a predetermined cooking mode, and wherein the pole engages the block at a third location relative to the cooker body when the cooker lid is placed on the upper rim of the cooker body and is in position for the predetermined cooking mode.

In accordance with another aspect of the present disclosure, there is provided a method of controlling cooking operations of an electric cooking appliance, comprising the steps of: (1) detecting a status of a cooker lid relative to a cooker body by way of engaging a block mounted near a periphery rim of the cooker lid with a pole disposed about an upper rim of the cooker body and being movable relative to the cooker body, wherein the pole is configured to be at a first location relative to the cooker body when the cooker lid is separated from the cooker body, wherein the pole engages the block at a second location relative to the cooker body when the cooker lid is placed on the upper rim of the cooker body and is out of position for a predetermined cooking mode, and wherein the pole engages the block at a third location relative to the cooker body when the cooker lid is placed on the upper rim of the cooker body and is in position for the predetermined cooking mode; (2) inputting the detected lid status to a cooking controller; and (3) programming the cooking controller to supply power for the predetermined cooking mode only when the pole engages the block at the third location relative to the cooker body.

Other features and advantages of the present invention will become apparent from the following detailed description and the accompanying drawings, which illustrate, by way of example, the principles of the invention.

BRIEF DESCRIPTION OF THE DRAWINGS

By way of example only, preferred embodiments of the present invention are described hereinafter with reference to the accompanying drawings, wherein.

DETAILED DESCRIPTION OF THE INVENTION

Figure 1:
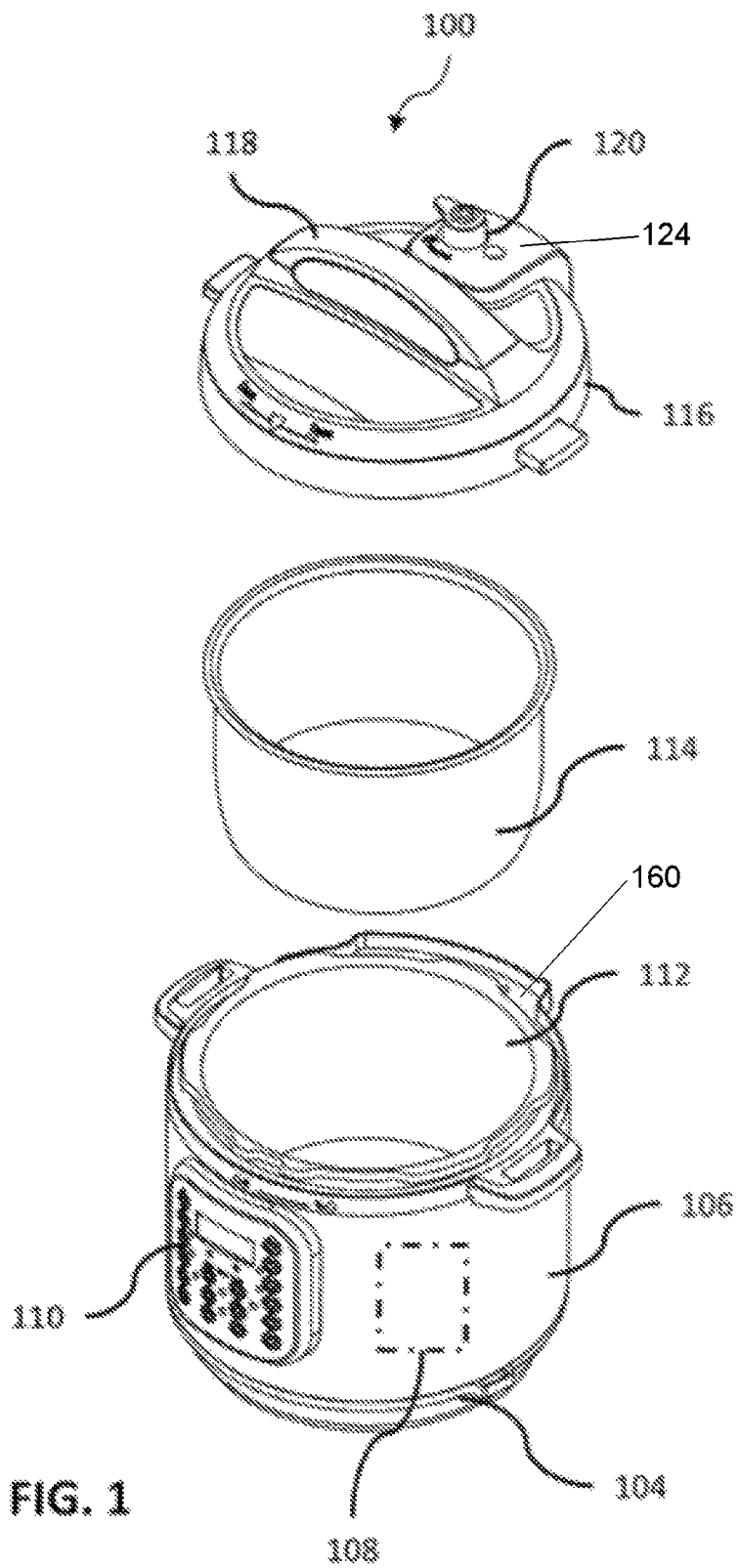
FIG. 1 is an exploded perspective view illustrating a pressure-cooking appliance in accordance with an example embodiment of the present disclosure.

Referring to FIGS. 1-8, example embodiments of an apparatus for detecting a cooker lid status, and example embodiments of a cooking appliance equipped with such apparatus, are shown. While the example embodiments described herein may refer to a particular type of cooking appliance (such as an electric pressure cooking appliance) for illustration purpose only, it is to be understood that the same principles, operations, and implementations disclosed herein are applicable to electric cookers generally and may be applicable to other suitable cooking appliances.

Referring to FIGS. 1-8, an example embodiment of the present invention is illustrated as an electric pressure cooking appliance 100 comprising an exterior body or housing 106; an outer pot 112 received in the housing 106; an inner pot 114 removably disposed within the outer pot 112; a lid 116; and an apparatus for detecting a status of the lid 116 relative to the housing or cooker body 106. The outer pot 112 can be secured to the housing 106 to form an integral part thereof. The inner pot 114 is a cooking vessel or container for receiving food items to be cooked under one or more cooking modes or programs, and can be inserted into the outer pot 112 for cooking food and removed therefrom for cleaning, storage or other use. Preferably, the inner pot 114 is made of suitable metal materials including stainless steel, and the outer pot 112 is made of metals, alloys, or other suitable rigid materials.

The housing 106 includes a base unit 104 for supporting a periphery sidewall of the housing 106. The base unit 104, the interior sidewall of housing 106 and the outer pot 112 generally define at least one internal chamber space which may at least partially receive and support a cooking controller 108 for controlling the various components of the pressure cooking appliance 100 and operations thereof. The pressure cooking appliance 100 may include a control panel 110 as a user interface for controlling the operations of the pressure cooking appliance 100, such as cooking mode, cooking pressure, cooking temperature, cooking time, start/stop, and other controls known in the art. One or more other components of the pressure-cooking appliance 100 may be at least partially disposed or installed within the internal chamber space 102 and/or the space between the outer pot 112 and the inner pot 114. For example, a heating element can be provided under a bottom wall of the inner pot 114. The heating element can be operably coupled to a source of electric power located in the internal chamber. In addition, various sensors in communication with the cooking controller 108 can be positioned at various locations of the pressure-cooking appliance 100 to measure or monitor pressure, temperature, weight, and other conditions to facilitate the cooking operations.

Referring to FIGS. 2-8, in an example embodiment of the present invention, an apparatus for detecting the status of a cooker lid 116 relative to a cooker body or housing 106 comprises a block 140 mounted to the cooker lid 116 near a periphery rim 122 of the lid 116; and a pole 150 disposed near an upper rim of the cooker body or housing 106 and being movable relative to the cooker body 106. The block 140 is constructed and arranged as a stepped structure having a stepped surface, comprising a first substantially flat surface 142, a second substantially flat surface 146, the second surface 146 being substantially parallel with the first surface 142, and an intermediate or transition surface 144 extending from the first surface 142 to the second surface 146. In other words, the first surface and the second surface are substantially parallel with a plane defined by the periphery rim 122 of the lid 116, while the transition surface 144 intersects the first surface 142 and the second surface 146 at respective angles. The transition surface 144 can be substantially flat in some embodiments, but can also be non-flat, curved, or in any other shape suitable for the apparatus described herein. In some embodiments, the block 140 is constructed and arranged to form a part of the lid 116 near a periphery rim 122 thereof. The block 140 can be secured directly to the lid 116, or can be mounted to a support structure 124 secured to the lid 116. The lid 116 is generally dome shaped and configured and dimensioned to substantially cover the opening of the inner pot 114. In some embodiments the lid 116 may have configurations other than a dome, such as a concave or flat configuration.

The lid 116 or a part thereof is preferably made of high strength, lightweight, high heat and pressure resistant material, including metals, alloys, and other suitable materials. In some embodiments, the lid 116 and the support structure 124 are integrally formed as a unitary, or one-piece construction. In some other embodiments, the support structure 124 is constructed with plastic or other suitable materials. In some embodiments, the block 140 is integrally formed with the support structure 124 as a unitary or one-piece structure. In some embodiments, the block 140 is removable or separable from the support structure 124, and can be secured or attached to the support structure 124 by at least one fastener 126 or any other suitable attachment means known in the art.

Figure 2:
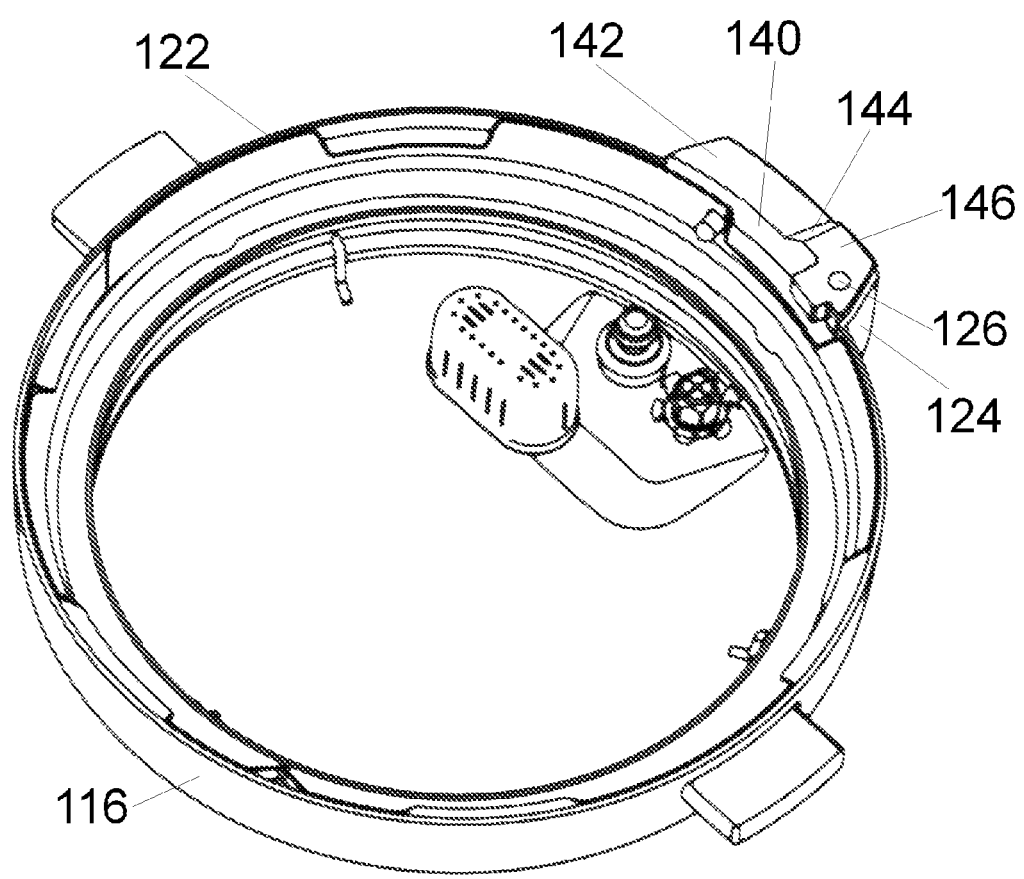
FIG. 2 is a perspective view of an underside of a lid in accordance with an example embodiment of the present disclosure.

As shown in FIG. 2, in some embodiments, the block 140 is disposed substantially along a portion of the periphery rim 122 of the lid 116. The block 140 is shaped and/or arranged to be substantially parallel with a portion of the periphery rim 122 along its length. For example, a substantial portion of an inner edge and a substantial portion of an outer edge of the block 140 can be arc shaped and having substantially the same curvature as that of the periphery rim 122. At least a portion of the block 140 downwardly extends beyond the periphery rim 122 when the lid 116 is deployed on the cooker body 106 for cooking. In some embodiments, the block 140 is configured in a way such that at least one of the first surface 142 and the second surface 146 protrudes beyond the edge of the periphery rim 122. Preferably, both the first surface 142 and the second surface 146 extend or protrude downwardly beyond the edge of the periphery rim 122 when the lid 116 is oriented for placement on top of the cooker body 106, wherein a distance from the periphery rim 122 to the second surface 146 is greater than a distance from the periphery rim 122 to the first surface 142. The block 140 is made of rigid materials such as plastic, metal, or any other suitable materials.

Referring to FIGS. 1 and 3-8, in some embodiments, a pole 150 is supported by the cooker body or housing 106 or a portion thereof, and is movable relative to at least a part of the cooker body or housing 106. In some embodiments, the movements of the pole 150 are at least in part guided by at least a portion of a deck member 160, which can be secured to the cooker body 106 or form an integral part thereof. For example, in some embodiments, the deck 160 is provided near or along a portion of the upper rim of the cooker body 106 in parallel therewith, and may comprise an opening or aperture 162 through or along which the pole 150 can move relative to the cooker body 106 and/or the deck 160. The aperture 162 is dimensioned and shaped to direct movements of the pole 150 with necessary clearance or freedom while providing sufficient stability and precision for the movements of the pole 150. In some embodiments, a biasing member 170 secured to the cooker body 106 is coupled to a portion of the pole 150. The biasing member 170 can be a coil spring, compression spring, cantilever spring, or any other similar biasing devices that are capable of exerting a restoring force on its load. The deck 160 is configured and positioned to receive the block 140 thereon and to allow the block 140 to move from one end of the deck 160 to another end thereof, when the lid 116 is placed on top of the cooker body at a predetermined initial location and is rotated by a user (e.g., using handle 118) from the initial location to a closure location.

Figure 3:
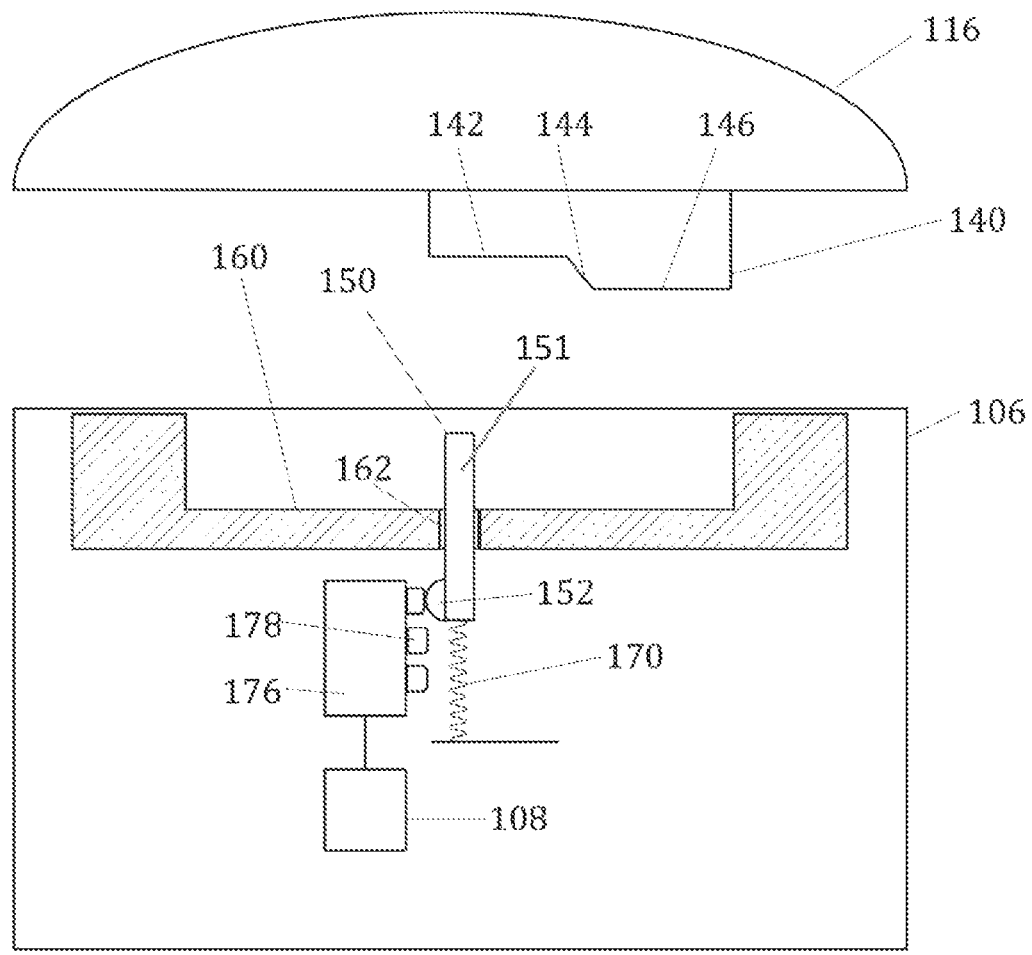
FIG. 3 is a schematic representation of a partial sectional side view illustrating an example embodiment of an apparatus for detecting status of a cooker lid relative to a cooker body when the cooker lid is separated from the cooker body.
Figure 4:
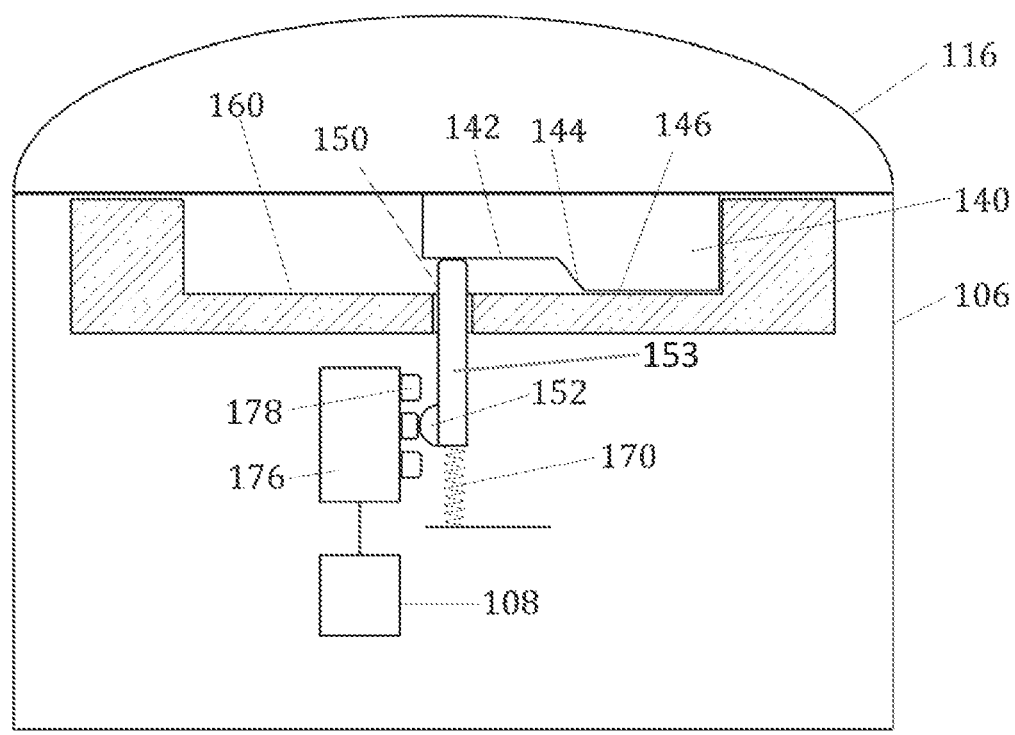
FIG. 4 is a schematic representation of a partial sectional side view illustrating an example embodiment of an apparatus for detecting status of a cooker lid relative to a cooker body when the cooker lid is placed on an upper rim of the cooker body and is out of position for pressure cooking.
Figure 5:
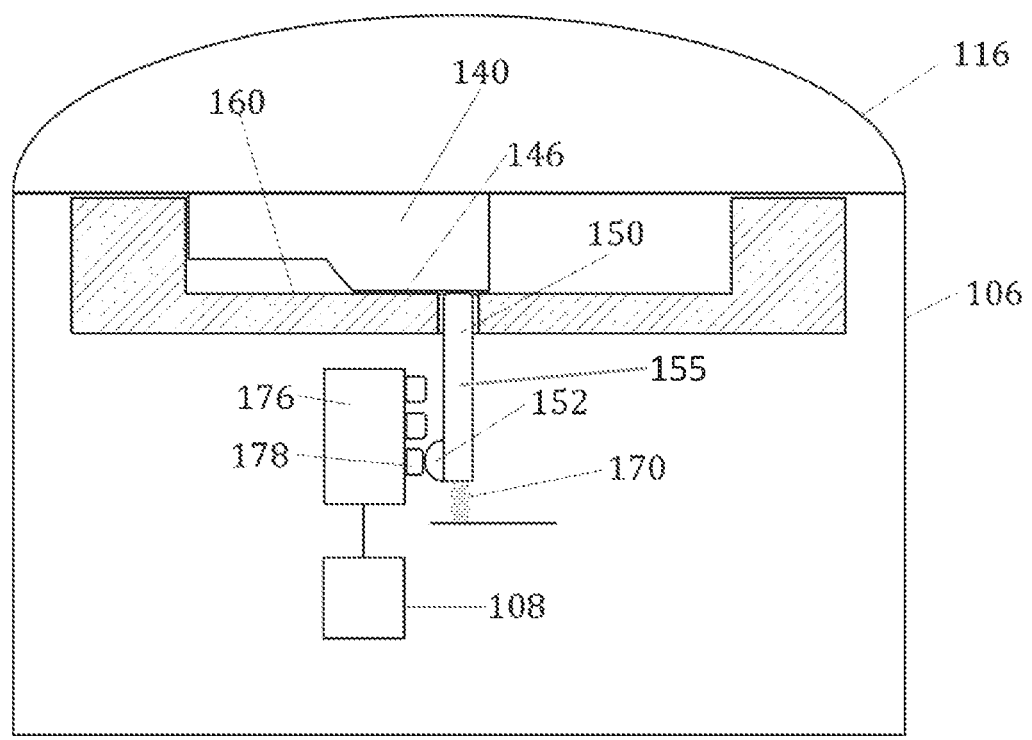
FIG. 5 is a schematic representation of a partial sectional side view illustrating an example embodiment of an apparatus for detecting status of a cooker lid relative to a cooker body when the cooker lid is placed on an upper rim of the cooker body and is in position for pressure cooking.

Referring to FIGS. 3-5, in some embodiments, the pole 150 is configured to be vertically movable relative to the cooker body 106 and/or the deck 160 by way of engagement or interaction with the block 140 and/or at least one of the surfaces 142, 144, and 146 thereof. In such embodiments, as shown in FIG. 3, the pole 150 is coupled with the biasing member 170 and is configured to be at a first vertical location (or height) 151 relative to the cooker body 106 and/or the deck 160 when the cooker lid 116 is separated from the cooker body 106, namely, when the pole 150 is not subject to, or free from any vertical force applied to its top.

Referring to FIG. 4, the aperture 162 is disposed at such a suitable or alignment location on the deck 160 that the pole 150 will be pressed downwardly into a first pressed state by the first surface 142 of the block 140 when the cooker lid 116 is placed on the upper rim of the cooker body 106 and is out of position for a predetermined cooking mode. A predetermined cooking mode can be any cooking mode or program supported by the cooking appliance, and includes pressure-cooking mode and/or slow cooking mode. In some example embodiments, such predetermined cooking mode is pressure-cooking mode. In some other example embodiments, such predetermined cooking mode can be slow-cooking mode or other desirable cooking modes. In some embodiments, such downward displacement of the pole 150 under the weight of the lid 116 will stop at a stable position when the second surface 146 of the block 140 substantially reaches or is in contact with an upper surface of the deck 160. In some embodiments, it is also possible to configure the elasticity and/or other properties and parameters of the biasing member 170 so that the weight of the lid 116 applied to the pole 150 is counter balanced by the restoring force of the biasing member 170 at a stable vertical position when the cooker lid 116 is placed on the upper rim of the cooker body 106 and is out of position for a predetermined cooking mode (e.g., pressure cooking). Thus, the pole 150 is configured to engage the block 140 or a part thereof (such as the first surface 142) at a second vertical location (or height) 153 relative to the cooker body 106 when the cooker lid 116 is placed on the upper rim of the cooker body 106 and is out of position for a predetermined cooking mode. Generally, in the context of pressure cooking, the lid 116 is said to be out of position for pressure cooking when the alignment or overlap between the bayonets of the lid and the lugs of the cooker body is insufficient to provide a secure closure for pressurized cooking (e.g., less than about 80~85% aligned), and the lid 116 is said to be in position for pressure cooking when the alignment or overlap between the bayonets of the lid and the lugs of the cooker body is sufficient to provide a secure closure for pressurized cooking (e.g., about 80~85% or more aligned). In other applications, such as electric cookers or slow cookers, the "out of position" and "in position" statuses of the lid 116 will generally be dependent upon the particulars of the cooker and/or any predetermined cooking mode to which the lid status may be relevant. For example, in the context of a slow cooker, the lid 116 may be said to be out of position for slow cooking when the position of the lid relative to the cooker body is such that it is insufficient to provide a secure closure for slow cooking, and the lid 116 may be said to be in position for slow cooking when the position of the lid relative to the cooker body is such that it is sufficient to provide a secure closure for slow cooking.

Referring to FIG. 5, as the lid 116 is rotated by a user from an out-of-position location, such as an initial lid/housing alignment location, toward an in-position lid closure location for pressuring cooking, the pole 150 will be in contact with the transition surface 144 of the block 140, and will be further pressed downwardly by the transition surface 144 of the block 140. As the rotation of the lid 116 continues toward a predetermined full closure location, the pole 150 will be pressed under the second surface 146 of the block 140. As such, the pole 150 is configured to engage the block 140 or a part thereof (such as the second surface 146) at a third vertical location (or height) 155 relative to the cooker body 106 when the cooker lid 116 is placed on the upper rim of the cooker body 106 and is in position (i.e. substantially at the closure location) for the predetermined cooking mode, such as pressure cooking. At this point, as illustrated in FIG. 5, the pole 150 is in a second pressed state and stops at a stable position where the top of the pole 150 is substantially flush with the second surface 146 of the block 140 and the upper surface of the deck 160.

Figure 6:
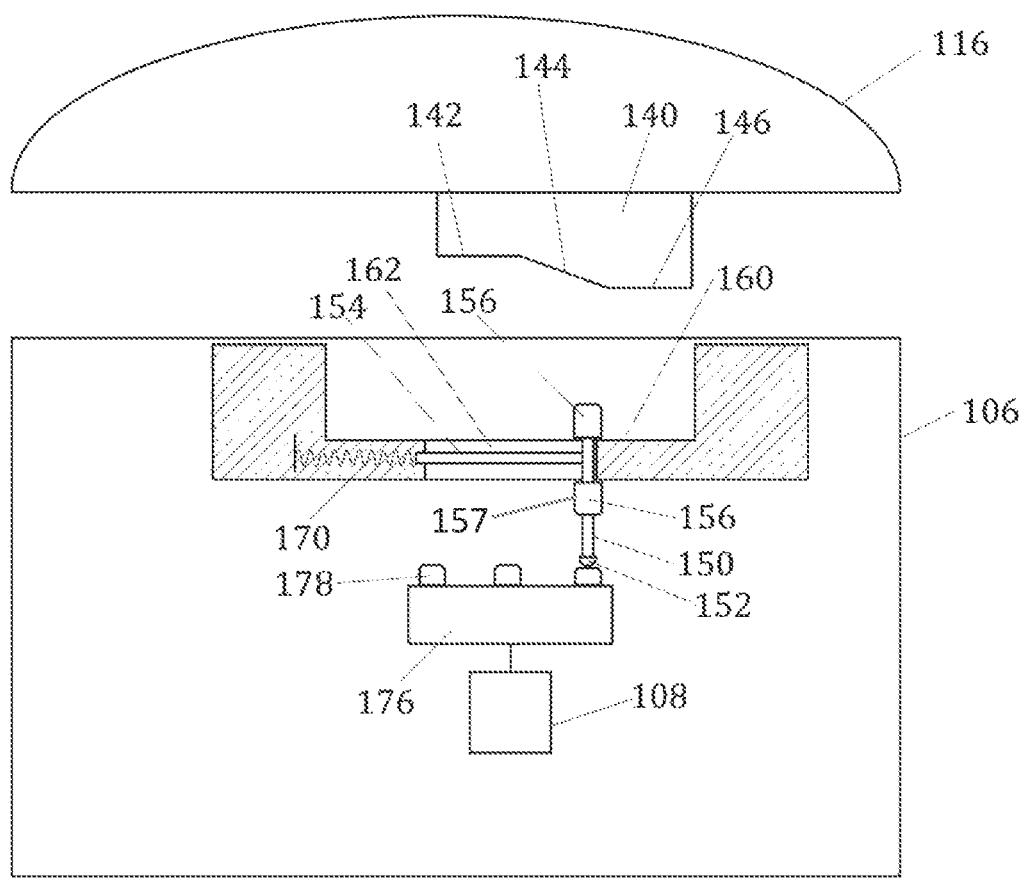
FIG. 6 is a schematic representation of a partial sectional side view illustrating the apparatus of FIG. 3 with an alternative pole configuration.
Figure 7:
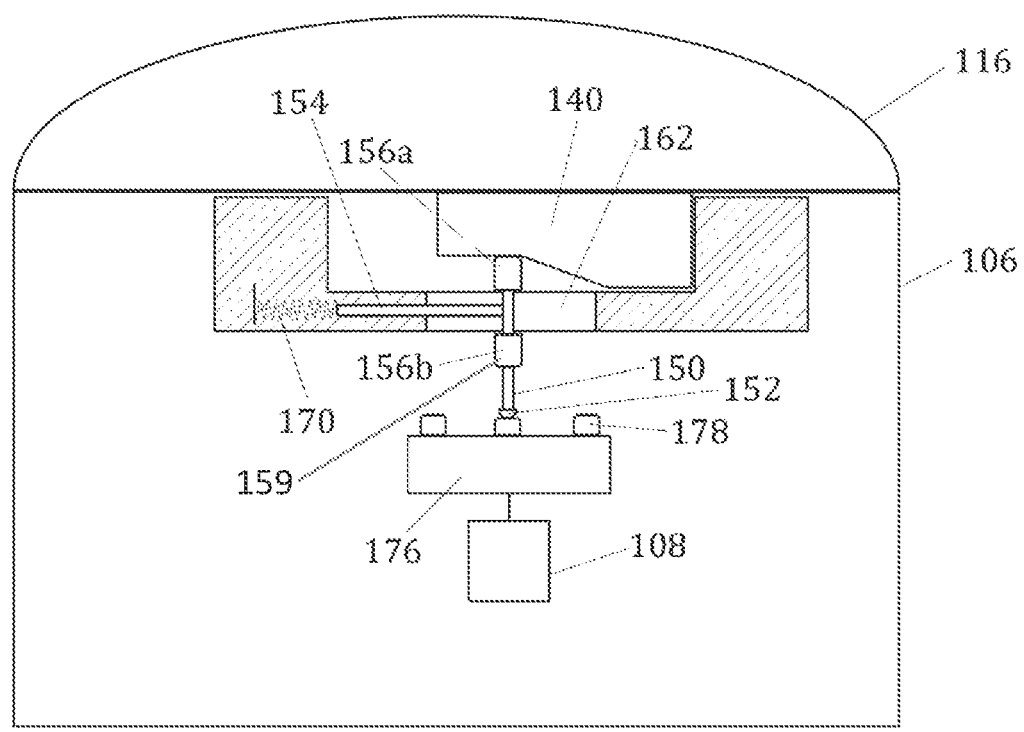
FIG. 7 is a schematic representation of a partial sectional side view illustrating the apparatus of FIG. 4 with an alternative pole configuration.
Figure 8:
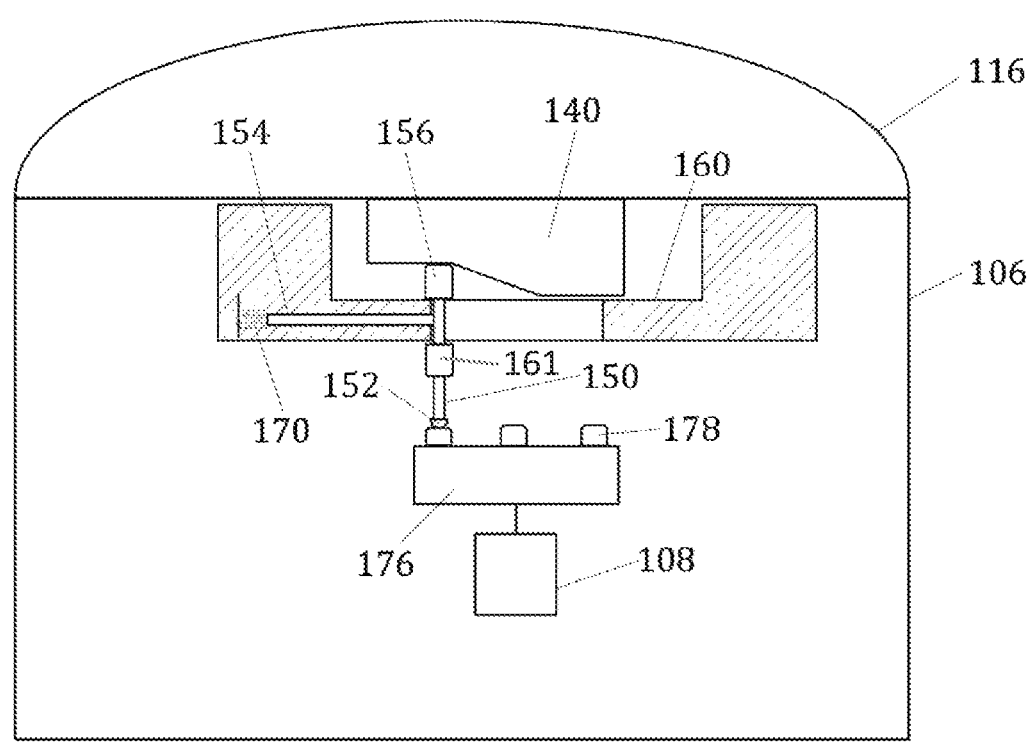
FIG. 8 is a schematic representation of a partial sectional side view illustrating the apparatus of FIG. 5 with an alternative pole configuration.

Referring to FIGS. 6-8, in some embodiments, the pole 150 is configured to be laterally or horizontally movable relative to the cooker body 106 and/or the deck 160 by way of engagement or interaction with the block 140 and/or at least one of the surfaces 142, 144, and 146 thereof. In such embodiments, the opening/aperture 162 can be dimensioned and configured as an elongated slot along which the pole 150 can move laterally from one end of the slot 162 to another end thereof. Preferably, the elongated slot 162 is arc shaped and substantially parallel with a length of the deck 160 and/or a portion of the upper rim of the cooker body 106. As shown in FIG. 6, acting with the biasing member 170, the pole 150 is configured to be at a first lateral location 157 relative to the cooker body 106 and/or the deck 160 when the cooker lid 116 is separated from the cooker body 106, namely, when the pole 150 is not subject to, or free from any lateral force applied to it by the lid 116. For example, the pole 150 can be arranged to be located at a first end of the slot 162 when the cooker lid 116 is separated from the cooker body 106, as illustrated in FIG. 6. The slot 162 is disposed at such a suitable location on the deck 160 that there is a predetermined clearance between each end of the slot 162 and a corresponding end of the deck 160, or an inner sidewall thereof. In other words, each end of the slot 162 is spaced apart from respective ends of the deck 160 or inner sidewalls thereof.

Referring to FIG. 7, the clearance between the first end of the slot 162 and its corresponding end of the deck 160 is configured to be sufficiently wide to receive the second surface 146 of the block 140, so that when the lid 116 is lowered and placed on the upper rim of the cooker body and is out of position for pressure cooking, the block 140 or the transition surface 144 thereof will push the pole 150 laterally toward a second end of the slot 162, thereby putting the pole 150 into a first pressed state wherein the second surface 146 of the block 140 substantially reaches or is in contact with an upper surface of the deck 160 while the pole 150 is at an intermediate location between the two ends of the slot 162. As such, the pole 150 is configured to engage the block 140 at a second lateral location 159 relative to the cooker body 106 and/or the deck 160 when the cooker lid 116 is placed on the upper rim of the cooker body 106 and is out of position for pressure cooking.

Referring to FIG. 8, as the lid 116 is rotated by a user from an out-of-position location, such as an initial lid alignment location, toward a lid closure location for pressuring cooking, the pole 150 will be further pushed by the block 140 or the transition surface 144 thereof toward and reaching the second end of the slot 162, thereby putting the pole 150 into a second pressed state wherein the pole 150 substantially reaches or is in contact with the second end of the slot 162. Thus, the pole 150 is configured to engage the block 140 at a third lateral location 161 relative to the cooker body 106 when the cooker lid 116 is placed on the upper rim of the cooker body 106 and is in position (i.e. substantially at the closure location) for pressure cooking.

In some embodiments, the pole 150 comprises a rod 154 radially extending from the pole 150 for coupling with the biasing member 170, as shown in FIGS. 6-8. This allows the biasing member 170 to be disposed closer to the deck 160 or integrated with the deck 160 to provide a compact movement mechanism for the pole 150. For example, in some embodiments, the deck 160 can provide an inner space or cavity (not shown) for receiving at least one of the biasing member 170 and the rod 154. Referring to FIGS. 6-8, in some embodiments, the pole 150 comprises at least one stopper 156 for reducing or minimizing vertical fluctuation in the lateral movements of the pole 150. To provide enhanced stability, in some embodiments, the at least one stopper 156 comprises two stoppers 156a and 156b located at opposite sides of the deck 160. In some embodiments, the at least one stopper 156 comprises two stoppers 156a and 156b located at opposite sides of the deck rod 154. The at least one stopper 156 may take any suitable form and shape for its purpose and function. For example, in some embodiments, the at least one stopper 156 may be constructed as a ball, roller, wheel or any other similar devices that facilitate easy lateral movements of pole along the slot 162 of the deck 160. The at least one stopper 156 can be integrally formed with the pole 150 as a unitary, or one-piece construction, or can be secured to the pole 150 in any suitable manner known in the art.

Advantageously, the apparatus disclosed in the example embodiments enables the status of the lid 116 relative to the cooker body or housing 106 to be associated with or derived from at least three stable positions of the pole 150 relative to the housing 106. Namely, the block 140 is constructed and arranged to engage with the pole 150 such that: the pole 150 is in a free state when the lid 116 does not sit on top of the outer pot 112 of the cooker or is separated from the cooker body 106, the pole 150 is in a first pressed state when the lid 116 is placed on top of the outer pot 112 or the cooker body 106 but is out of position for a predetermined cooking mode, for example pressure cooking; and the pole 150 is in a second pressed state when the lid 116 is placed on top of the outer pot 112 or the cooker body 106 and is in position for the predetermined cooking mode (e.g., pressure cooking). As a result, the detectable statuses of the lid 116 include: (1) the lid 116 is separated from the cooker body or housing 106; (2) the lid 116 is placed on the cooker body and is out of position for a predetermined cooking mode, such as pressure cooking; and (3) the lid 116 is placed on the cooker body and is in position for the predetermined cooking mode (e.g., pressure cooking). Compared to the prior art pressure cookers, the lid status detection mechanism described herein enables the cooking controller 108 to control the cooking operations in a more comprehensive, accurate and consistent manner.

For example, in some embodiments, the pressure cooking appliance 100 or the apparatus for detecting the status of the lid comprises a multi-state switch 176. The multi-state switch 176 can be secured to the cooker body 106, and comprises a plurality of switch elements 178. The multi-state switch 176 is configurable or operable to be triggered by the positions of the pole 150 or movements thereof. As shown in FIGS. 3-8, in some embodiments, the multi-state switch 176 comprises three switch elements 178 each being operable to be actuated by the pole 150 at the first, second, and third stable positions of the pole 150 relative to the housing 106, respectively. The pole 150 may comprise a protrusion portion 152 for activating or actuating any one of the three switch elements 178 by contacting their respective contacts or connecting elements. The multi-state switch 176 and/or the three switch elements 178 are in electronic communication with, or coupled to the cooking controller 108 directly or indirectly or otherwise configured to provide inputs to the cooking controller 108 representing or in response to the detected lid status based on the positions of the pole 150.

Accordingly, in some embodiments, the cooking controller 108 controls the cooking process based on the three detectable statuses of the cooker lid 116. In some embodiments, the cooking controller 108 is programmed to control the cooking process as a function of the detected lid status and the current cooking mode (e.g., pressure cooking). For instance, when the pressure cooking appliance 100 is in pressure cooking mode, the cooking controller 108 can be programmed to supply power for or permit pressure cooking only when the lid 116 is placed on the cooker body and is in position for pressure cooking, thereby providing improved safety during the pressure cooking process. When the pressure cooking appliance 100 is in a non-pressure cooking mode, the cooking controller 108 can be programmed to permit cooking when the lid 116 is partially closed relative to the housing 106 or removed therefrom, depending on the particulars of the cooking mode. Therefore, a method of controlling cooking operations of an electric cooking appliance can be implemented in accordance with the present disclosure, the method includes the steps of: (1) detecting a status of a cooker lid 116 relative to a cooker body 106 by way of engaging a block 140 mounted near a periphery rim of the cooker lid 116 with a pole 150 disposed about an upper rim of the cooker body 106 and being movable relative to the cooker body 106, wherein the pole 150 is configured to be at a first location relative to the cooker body 106 when the cooker lid 116 is separated from the cooker body 106, wherein the pole 150 engages the block 140 at a second location relative to the cooker body 106 when the cooker lid 116 is placed on the upper rim of the cooker body 106 and is out of position for a predetermined cooking mode, for example pressure cooking, and wherein the pole 150 engages the block 140 at a third location relative to the cooker body 106 when the cooker lid 116 is placed on the upper rim of the cooker body 106 and is in position for the predetermined cooking mode (e.g., pressure cooking); (2) inputting the detected lid status to a cooking controller 108; and (3) programming the cooking controller 108 to supply power for the predetermined cooking mode (e.g., pressure cooking) only when the pole 150 engages the block at the third location relative to the cooker body 106.

Although the present invention has been described in considerable detail with reference to certain preferred embodiments thereof, other embodiments and modifications are possible. Therefore, the scope of the appended claims should not be limited by the preferred embodiments set forth in the examples, but should be given the broadest interpretation consistent with the description as a whole.

What is claimed is:

1. An apparatus for detecting status of a cooker lid relative to a cooker body, comprising:
    a block mounted to the cooker lid near a periphery rim thereof; and
    a pole disposed about an upper rim of the cooker body and being movable relative to the cooker body,
    wherein a cooking process is determined based on a detected cooker lid status and a current cooking mode,
    wherein the pole is detected to be at a first location relative to the cooker body when the cooker lid is separated from the cooker body, wherein the pole engages the block at a second location relative to the cooker body when the cooker lid is placed on the upper rim of the cooker body and is out of position for a first predetermined cooking mode, wherein the pole engages the block at a third location relative to the cooker body when the cooker lid is placed on the upper rim of the cooker body and is in position for the first predetermined cooking mode,
    wherein when the apparatus is in the first predetermined cooking mode, a first predetermined cooking process is permitted only when the pole engages the block at the third location, and
    wherein when the apparatus is in a second predetermined cooking mode, a second predetermined cooking process is permitted when the pole is detected to be at the first location or the second location.

2. The apparatus of claim 1, wherein the pole is constructed and arranged to be vertically movable relative to the cooker body.

3. The apparatus of claim 1, wherein the pole is constructed and arranged to be laterally movable relative to the cooker body.

4. The apparatus of claim 1, further comprising a biasing member secured to the cooker body for restoring the pole to the first location relative to the cooker body.

5. The apparatus of claim 1, further comprising a deck secured to the cooker body, the deck having an aperture for directing movements of the pole.

6. The apparatus of claim 1, further comprising a multi-state switch secured to the cooker body, the multi-state switch having three switch elements each being operable to be actuated by the pole at the first, second, and third locations relative to the cooker body, respectively, wherein the multi-state switch is in electronic communication with a cooking controller to provide input to the cooking controller in response to the first, second, and third locations of the pole.

7. The apparatus of claim 2, wherein the block comprises a stepped surface comprising a first substantially flat surface, a second substantially flat surface that is substantially parallel with the first substantially flat surface, and a transition surface extending from the first substantially flat surface to the second substantially flat surface, wherein the pole engages the first substantially flat surface at the second location relative to the cooker body when the cooker lid is placed on the upper rim of the cooker body and is out of position for the predetermined cooking mode, and wherein the pole engages the second substantially flat surface at the third location relative to the cooker body when the cooker lid is placed on the upper rim of the cooker body and is in position for the predetermined cooking mode.

8. The apparatus of claim 4, wherein the pole comprises a rod radially extending from the pole for coupling with the biasing member.

9. The apparatus of claim 1, wherein the first predetermined cooking mode is a pressure cooking mode.

10. The apparatus of claim 1, wherein the second predetermined cooking mode is a slow cooking mode.

11. An electric cooking appliance comprising:
    a cooker lid comprising a block mounted near a periphery rim of the cooker lid; and
    a cooker body comprising a pole disposed about an upper rim of the cooker body and being movable relative to the cooker body,
    wherein a cooking process is determined based on a detected cooker lid status and a current cooking mode,
    wherein the pole is detected to be at a first location relative to the cooker body when the cooker lid is separated from the cooker body, wherein the pole engages the block at a second location relative to the cooker body when the cooker lid is placed on the upper rim of the cooker body and is out of position for a first predetermined cooking mode, wherein the pole engages the block at a third location relative to the cooker body when the cooker lid is placed on the upper rim of the cooker body and is in position for the first predetermined cooking mode,
    wherein when the cooking appliance is in the first predetermined cooking mode, a first predetermined cooking process is permitted only when the pole engages the block at the third location, and
    wherein when the cooking appliance is in a second predetermined cooking mode, a second predetermined cooking process is permitted when the pole is detected to be at the first location or the second location.

12. The electric cooking appliance of claim 11, wherein the pole is constructed and arranged to be vertically movable relative to the cooker body.

13. The electric cooking appliance of claim 11, wherein the pole is constructed and arranged to be laterally movable relative to the cooker body.

14. The electric cooking appliance of claim 11, further comprising a biasing member secured to the cooker body for restoring the pole to the first location relative to the cooker body.

15. The electric cooking appliance of claim 11, further comprising a deck secured to the cooker body, the deck having an aperture for directing movements of the pole.

16. The electric cooking appliance of claim 11, further comprising a multi-state switch secured to the cooker body, the multi-state switch having three switch elements each being operable to be actuated by the pole at the first, second, and third locations relative to the cooker body, respectively, wherein the multi-state switch is in electronic communication with a cooking controller to provide inputs to the cooking controller representing the first, second, and third locations of the pole.

17. The electric cooking appliance of claim 12, wherein the block comprises a stepped surface comprising a first substantially flat surface, a second substantially flat surface that is substantially parallel with the first substantially flat surface, and a transition surface extending from the first substantially flat surface to the second substantially flat surface, wherein the pole engages the first substantially flat surface at the second location relative to the cooker body when the cooker lid is placed on the upper rim of the cooker body and is out of position for the predetermined cooking mode, and wherein the pole engages the second substantially flat surface at the third location relative to the cooker body when the cooker lid is placed on the upper rim of the cooker body and is in position for the predetermined cooking mode.

18. The electric cooking appliance of claim 11, wherein the first predetermined cooking mode is a pressure cooking mode.

19. A method of controlling cooking operations of an electric cooking appliance, comprising the steps of:
  (1) detecting a status of a cooker lid relative to a cooker body by way of engaging a block mounted near a periphery rim of the cooker lid with a pole disposed about an upper rim of the cooker body and being movable relative to the cooker body, wherein the pole is detected to be at a first location relative to the cooker body when the cooker lid is separated from the cooker body, wherein the pole engages the block at a second location relative to the cooker body when the cooker lid is placed on the upper rim of the cooker body and is out of position for a first predetermined cooking mode, wherein the pole engages the block at a third location relative to the cooker body when the cooker lid is placed on the upper rim of the cooker body and is in position for the first predetermined cooking mode;
  (2) inputting the detected lid status to a cooking controller;
  (3) detecting a current cooking mode of the cooking appliance;
  (4) when the cooking appliance is in the first predetermined cooking mode, controlling the cooking controller to supply power for the first predetermined cooking mode only when the pole engages the block at the third location relative to the cooker body; and
  (5) when the cooking appliance is in a second predetermined cooking mode, controlling the cooking controller to supply power for the second predetermined cooking mode when the pole is detected to be at the first location or the second location relative to the cooker body.

20. The method of claim 19, wherein the second predetermined cooking mode is a slow cooking mode.

21. The apparatus of claim 1, further comprising a multi-state switch secured to the cooker body, the multi-state switch having three switch elements each being operable to be actuated by the pole at the first, second, and third locations relative to the cooker body, respectively,
  wherein the three switch elements are disposed along a first direction, the pole moves along a second direction from the first location to the second location and then to the third location, and
  wherein the first direction is parallel to the second direction.

22. The electric cooking appliance of claim 11, further comprising a multi-state switch secured to the cooker body, the multi-state switch having three switch elements each being operable to be actuated by the pole at the first, second, and third locations relative to the cooker body, respectively,
  wherein the three switch elements are disposed along a first direction, the pole moves along a second direction from the first location to the second location and then to the third location, and
  wherein the first direction is parallel to the second direction.

23. The method of claim 19, wherein the electric cooking appliance further comprises a multi-state switch secured to the cooker body, the multi-state switch having three switch elements each being operable to be actuated by the pole at the first, second, and third locations relative to the cooker body, respectively,
  wherein the three switch elements are disposed along a first direction, the pole moves along a second direction from the first location to the second location and then to the third location, and
  wherein the first direction is parallel to the second direction.

\* \* \* \* \*